United States Patent [19]

Suzuki et al.

[11] Patent Number: 4,878,211

[45] Date of Patent: Oct. 31, 1989

[54] METHOD AND APPARATUS FOR CORRECTING THE LOOP GAIN OF A SERVO LOOP IN ACCORDANCE WITH MEASUREMENTS DURING OPEN-LOOP OPERATION

[75] Inventors: Masanori Suzuki; Kiyoshi Tateishi, both of Saitama, Japan

[73] Assignee: Pioneer Electronic Corporation, Tokyo, Japan

[21] Appl. No.: 53,790

[22] Filed: May 26, 1987

[30] Foreign Application Priority Data

May 26, 1986 [JP] Japan ............................ 61-121677
Sep. 19, 1986 [JP] Japan ............................ 61-221680

[51] Int. Cl.$^4$ ............................................. G11B 7/09
[52] U.S. Cl. ............................................. 369/44; 369/45; 369/54; 360/77.03; 318/640; 358/342
[58] Field of Search ............................ 369/43–46, 369/53–54, 58; 360/73, 77, 78, 73.01, 73.03, 73.04, 73.09, 77.01–77.03, 77.05–77.08, 77.11–77.13, 78.01, 78.02, 78.04–78.05, 78.09, 78.14; 318/635, 638, 640, 650, 652, 677, 681; 250/201 DF; 358/342

[56] References Cited

U.S. PATENT DOCUMENTS

| | | | |
|---|---|---|---|
| 2,978,647 | 4/1961 | Lehmann | 318/638 X |
| 3,430,053 | 2/1969 | Westhaver | 318/640 X |
| 3,684,940 | 8/1972 | Lutz | 318/635 |
| 3,691,543 | 9/1972 | Mueller | 360/77 |
| 3,851,238 | 11/1974 | Fletcher et al. | 318/640 X |
| 3,893,180 | 7/1975 | Braun et al. | 360/77 |
| 3,959,820 | 5/1976 | Braun | 360/77 |
| 3,994,016 | 11/1976 | Moghadam | 360/77 |
| 4,133,011 | 1/1979 | Kurzweil, Jr. | 318/638 X |
| 4,190,859 | 2/1980 | Kinjo | 369/44 X |
| 4,338,682 | 7/1982 | Hosaka et al. | 369/44 |
| 4,340,950 | 7/1982 | Kosaka | 369/44 |
| 4,406,000 | 9/1983 | Shoji et al. | 369/44 |
| 4,439,800 | 3/1984 | Powell | 360/78 |
| 4,446,546 | 5/1984 | Miller | 369/44 |
| 4,475,182 | 10/1984 | Hosaka | 369/46 X |
| 4,488,188 | 12/1984 | Hansen et al. | 360/77 |
| 4,504,937 | 3/1985 | Yonezawa et al. | 369/44 |
| 4,546,395 | 10/1985 | Sellars | 360/77 |
| 4,551,776 | 11/1985 | Roalson | 318/681 X |
| 4,564,929 | 1/1986 | Yonezawa et al. | 369/46 X |
| 4,580,255 | 4/1986 | Inoue et al. | 369/44 |
| 4,587,644 | 5/1986 | Fujiie | 369/46 X |
| 4,594,539 | 6/1986 | Michelson | 318/640 |
| 4,613,963 | 9/1986 | Hirano | 369/44 |
| 4,616,353 | 10/1986 | Kaneda et al. | 358/342 X |
| 4,682,253 | 7/1987 | Leslie | 360/77 |
| 4,683,560 | 7/1987 | Takeuchi et al. | 369/45 |
| 4,700,056 | 10/1987 | Silvy et al. | 369/45 X |
| 4,707,648 | 11/1987 | Minami | 318/640 |

Primary Examiner—Alan Faber
Assistant Examiner—W. R. Young
Attorney, Agent, or Firm—Sughrue, Mion, Zinn, Macpeak & Seas

[57] ABSTRACT

A servo loop particulary useful for a focusing or tracking servo in an optical disk. The peak-to-peak value of an error signal in the servo loop is detected while the optical pickup is being driven perpendicularly to the disk in focusing or transversely to the disk in tracking. The detected peak-to-peak value is used to adjust the gain of a variable gain amplifier included in the servo loop.

15 Claims, 6 Drawing Sheets

METHOD AND APPARATUS FOR CORRECTING THE LOOP GAIN OF A SERVO LOOP IN ACCORDANCE WITH MEASUREMENTS DURING OPEN-LOOP OPERATION

BACKGROUND OF THE INVENTION

1. Field of the Invention

The present invention relates to a method and apparatus for correcting the loop gain of a servo loop in a fine adjustment servo system such as a focus servo system and a tracking servo system.

2. Background of the Art

A servo system such as a tracking servo system is used for making an information detecting point accurately follow a recording track of a disk. A focus servo system which always accurately focuses a laser beam as the information detecting point upon the recording face of the disk is a prerequisite for e.g., an optical playback for use in replaying the information recording disk (simply called the disk) including video and digital audio disks. Those servo systems are classified as fine adjustment servo systems as compared with coarse adjustment servo systems such as a slider servo system used for coarsely adjusting a moving object over comparatively large distances. These fine adjustment servo systems limit the deflection of the object being controlled (such as an objective lens or pickup including the objective lens) relative to a target within a finely adjustable range.

In the fine adjustment servo system, however, the loop gain of each servo system may fluctuate because of variations in the power of a light source such as a laser diode disk reflectance and a focus error signal detecting system. The fluctuation of the loop gain may be detrimental to the loop control against focus and tracking errors or may cause oscillation. Accordingly, stable servo operation is unavailable if the loop gain of each servo system fluctuates.

SUMMARY OF THE INVENTION

The present invention is intended to solve the aforesaid problems and it is therefore an object of the invention to provide a method and apparatus for correcting the loop gain of a fine adjustment servo loop and for making possible stable servo operation at all times by maintaining the loop gain at the optimum value.

The method and apparatus for fine adjustment of the loop gain of a servo loop including an amplifier for amplifying a given error signal is characterized in that a variable gain amplifier is used as the amplifier to detect the difference or peak-to-peak value (p-p) of the positive and negative crest values of the error signal obtained while the servo loop is opened. Further, a gain constant is set based on the peak-to-peak value detected and the gain of the variable gain amplifier is controlled in accordance with the gain constant.

DETAILED DESCRIPTION OF THE PREFERRED EMBODIMENTS

Referring now to the accompanying drawings, a detailed description will subsequently be given of embodiments of the present invention.

Figure 1:
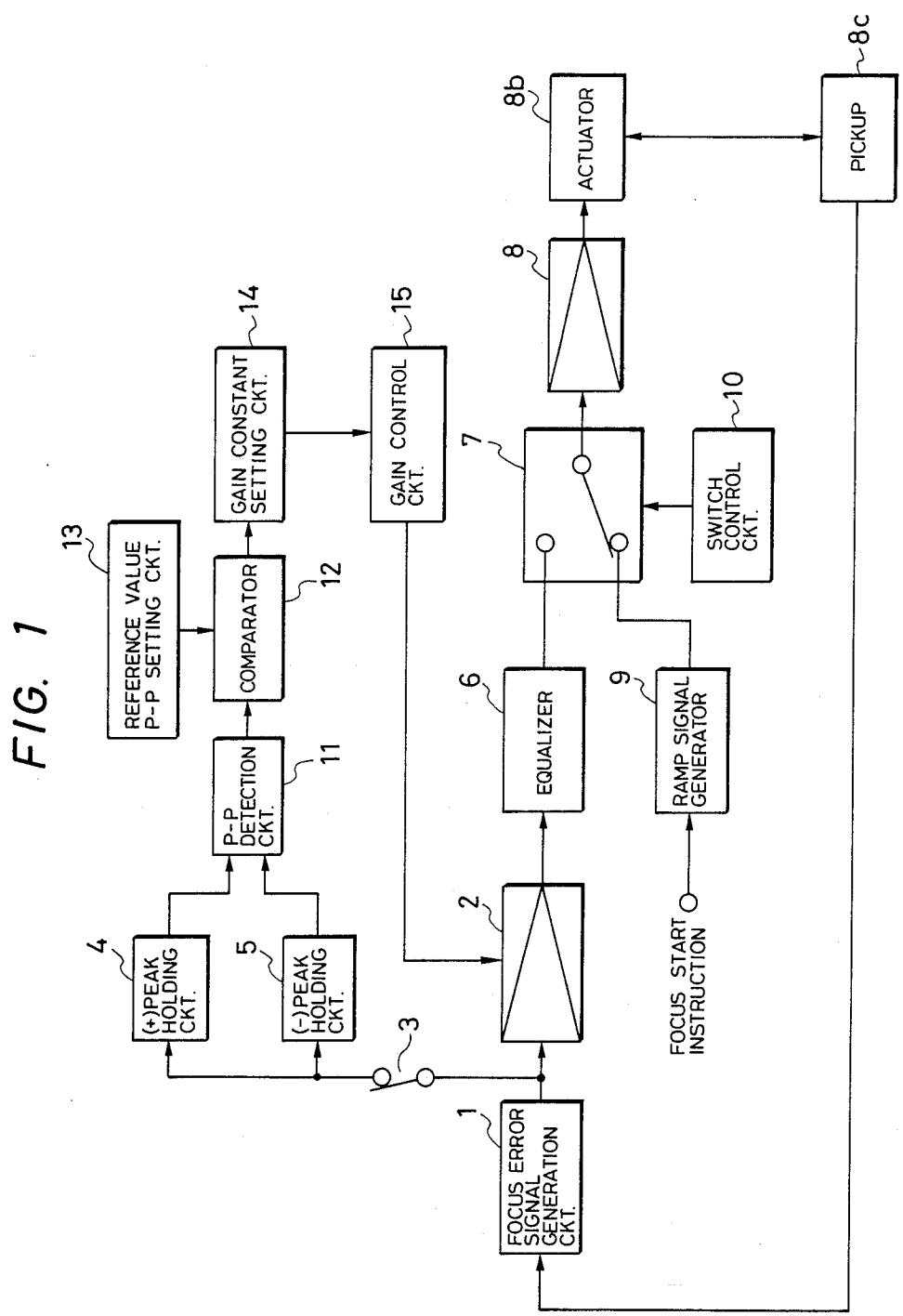
FIG. 1 is a block diagram showing an embodiment of the present invention, applied to a focus servo system.

FIG. 1 is a block diagram of an embodiment of the present invention applied to a focus servo system. As shown in FIG. 1, an error signal generating circuit 1 is used to generate a focus error signal based on one or more light beams emitted from a pickup 8c and reflected from e.g., the recording face of a disk. For the generation of the focus error signal, there is employed the so-called astigmatic method for obtaining the error signal by producing astigmatism in the light beam using a cylindrical lens. A quadrant detector receives the astigmatic light beam and the error signal is obtained using the four outputs of the quadrant detector. Since the way of obtaining the error signal with the astigmatic method is well known, the description of the specific detailed schematic and functions thereof will be omitted.

The focus error signal generated by the focus error signal generating circuit 1 is supplied to an error amplifier 2 having a variable gain and is also supplied to a positive peak holding circuit 4 and a negative peak holding circuit 5 through a switch 3. The focus error signal amplified by the error amplifier 2 becomes one of the inputs to a loop switch 7 via an equalizer circuit 6. The focus error signal passed through the loop switch 7 is supplied to a focus actuator 8b through a drive amplifier 8. The focus actuator is used to move an objective lens (not shown) contained in a pickup 8c along the optical axis.

The focus servo loop is thus formed and, when the loop switch 7 is caused to select the output of the equalizer circuit 6, the loop is in the closed state. By driving the focus actuator according to the focus error signal generated by the focus error signal generating circuit 1, light beams for use in reading out information can be focused accurately on the recording face of the disk.

On the other hand, a ramp signal generated by a ramp signal generating circuit 9 forms the other input to the loop switch 7. When the servo loop is held open, the ramp signal is generated in response to focus start instructions from the outside and is supplied to the focus actuator through the drive amplifier 8. The loop switch 7 is changeably operated by a switch control circuit 10. The ramp signal is generated in response to the focus start instructions and, while the loop is held open, is used to drive the focus actuator so that the objective lens is gradually brought close to the recording face of the disk from a position sufficiently separated vertically therefrom. At this time, the focus error signal induced at the output of the error amplifier 2 manifests the so-called S-shaped curve characteristics, shown in FIG. 2, relative to the displacement of the objective lens off the recording face of the disk.

The aforesaid switch 3 is interlocked with, e.g., the loop switch 7 and is closed while the loop is held open so as to supply the focus error signal to the positive and negative peak holding circuits 4 and 5. The positive and negative peak holding circuits 4 and 5 are used to hold the positive and negative peak values (crest values) of the focus error signal (see FIG. 2) having the S-shaped characteristic obtained when the objective lens is driven by the ramp signal generated by the ramp signal generating circuit 9. Those values thus held are supplied to a peak-to-peak value detection circuit 11 in which a peak-to-peak value p-p (the difference between the positive and negative crest values) is detected. The value p-p thus detected is supplied to a comparator 12. The comparator 12 compares the detected value p-p with a reference value p-p set in a reference value p-p setting circuit 13 and produces a comparison output corresponding to the difference in level between the reference value p-p and what has been detected. The comparison output is supplied to a gain constant setting circuit 14. The gain constant setting circuit 14 is provided with a gain constant table and so operated as to select a gain constant corresponding to the comparison output given by the comparator 12 and supply the corresponding output to a gain control circuit 15. The values in the gain constant table are such that, by the degree that the detected p-p value is less than the reference p-p value, the gain of the amplifier 2 is increased. The gain control circuit 15 controls the gain of the error amplifier 2 in proportion to the output of the gain constant setting circuit 14.

The operation of the circuitry thus arranged will subsequently be described.

Figure 2:
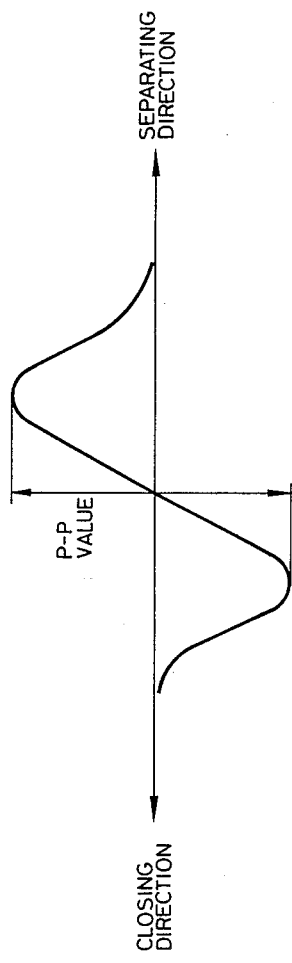
FIG. 2 illustrates a change in the waveform of a focus error signal relative to the position of an objective lens from the recording face of a disk.

The loop switch 7 is initially assumed in such a state as to choose the output of the ramp signal generating circuit 9 (in the open-loop state) When the focus start instructions are given in that state, the ramp signal generating circuit 9 responds to the instructions, thus starting to generate the ramp signal. As a result, the objective lens is brought close to the recording face of the disk gradually from a position sufficiently separated vertically therefrom. The focus error signal then indicates positive and negative peak values in and out of focus in terms of signal levels as shown in FIG. 2. The peak values of the focus error signal subject to change by loop gain fluctuations resulting from variations in disk reflectance and the focus error signal in the detection system.

The positive and negative peak values of the focus error signal are respectively held in the peak holding circuits 4 and 5. The difference between both the peak values, i.e., the peak-to-peak value p-p, is detected by the p-p value detection circuit 11 at the next stage. The difference in level between the detected value p-p and the reference value p-p, preset in the reference value p-p setting circuit 13 according to the loop gain as a reference, is detected by the comparator 12. The difference in level corresponds to the variables of the loop gain. In the gain constant a setting circuit 14, a gain constant corresponding to the comparison output of the comparator 12 is selected from the gain constant table. Based on the gain constant, the gain control circuit 15 controls the gain of the error amplifier 2. The detected value p-p is made coincident thereby with the reference value p-p, so that the optimum loop gain value is set.

The error amplifier 2 is thus used to detect the peak-to-peak value p-p of the focus error signal having the S-shaped curve characteristics and its gain is so controlled a to make the detected value p-p coincide with the reference value p-p. Thereby the loop gain can be maintained at the optimum value despite variations in the power of the light source of, e.g., a laser diode, disk reflectance and the focus error signal in the detection system. In consequence, the stable operation of the focus servo can always be secured.

Although it has been arranged in the aforesaid embodiment that the peak-to-peak value p-p of the focus error signal prior to being amplified is detected in the error amplifier 2, the peak-to-peak value p-p thereof after being amplified may be detected.

Figure 3:
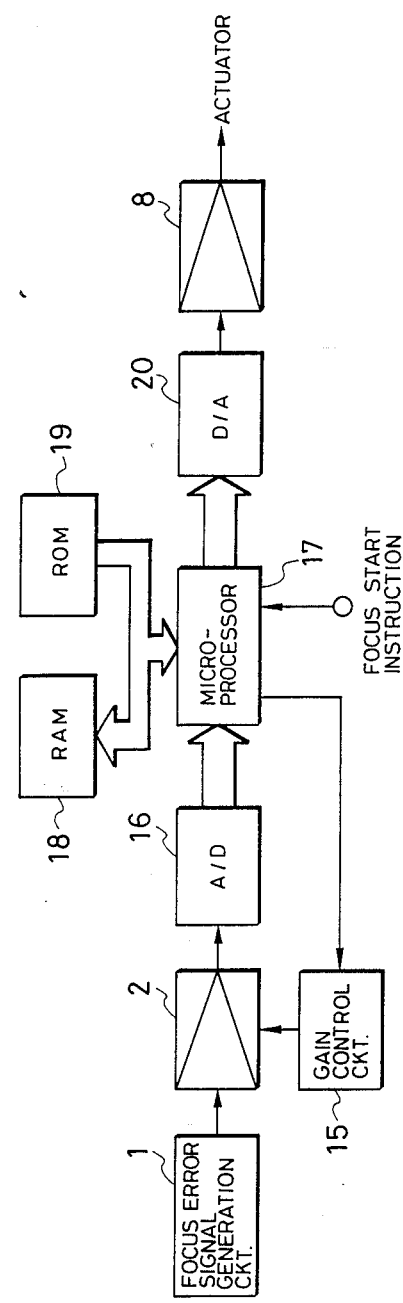
FIG. 3 is a block diagram when the system of FIG. 1 is formed with a microprocessor.

Although a description has been given of a case where the loop gain is corrected by the hardware in the aforesaid embodiment, it is also possible as shown in FIG. 3 to do so by means of software and a microprocessor with an effect equivalent to what is achievable as described above. A description will further be given of a case where the microprocessor is employed.

In FIG. 3, like reference characters are given to like or corresponding parts of FIG. 1. In this embodiment, a description will be given of a case where the peak-to-peak value p-p of the focus error signal is detected after being amplified by the error amplifier 2. In FIG. 3, likewise, the focus error signal amplified by the error amplifier 2 is converted by an A/D (analog/digital) converter 16 into a digital signal before being supplied to a microprocessor 17. The microprocessor 17 starts control operation in response to the focus start instructions supplied from the outside, produces the ramp or focus error signal depending on the resulting operating condition and makes the focus error signal undergo given equalization. While the loop is held open, moreover, the microprocessor 17 fetches in the output level of the A/D converter 16 and holds the positive and negative peak levels in the waveform of FIG. 2 in a RAM (random access memory) 18 while detecting the peak-to-peak value p-p. It obtains the difference in level between the detected value p-p and the preset reference value p-p, reads out a gain constant corresponding to the level difference from a ROM (Read Only Memory) 29, and sends a corresponding output to the gain control circuit 15. The gain control circuit 15 controls the gain of the error amplifier 2 in accordance with the output of the microprocessor 17. The ramp or focus error signal produces by the microprocessor 17 is converted by a D/A (digital/analog) converter 20 into an analog signal, which is then supplied to the focus actuator through the drive amplifier 8.

Figure 4:
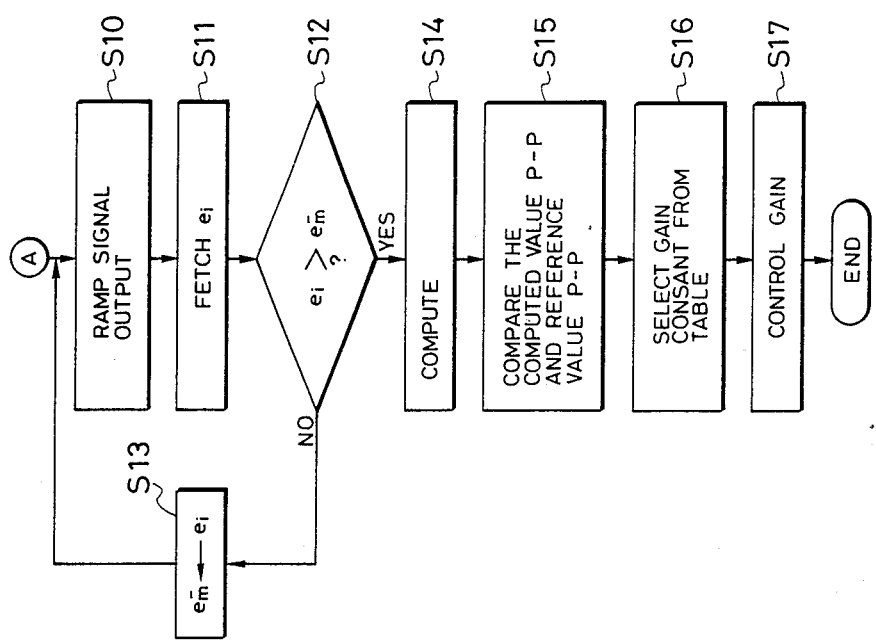
FIG. 4 is a flowchart showing an operating procedure executed by the microprocessor of FIG. 3.
Figure 4:
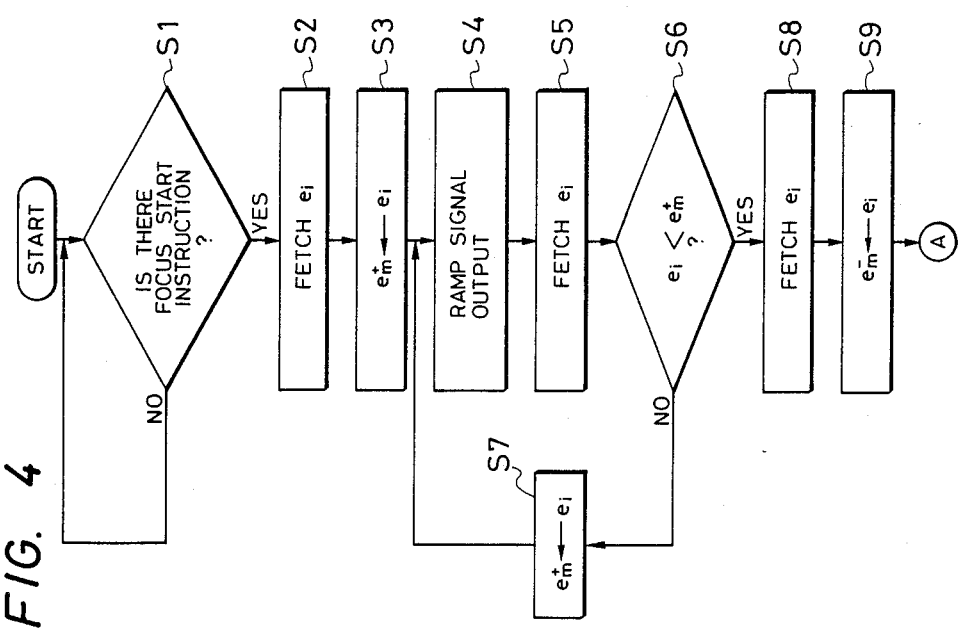

Referring to a flowchart of FIG. 4, a description will further be given of the correction of the loop gain executed by the microprocessor 17.

Upon receiving the focus start instructions from the outside (STEP 1), the microprocessor 17 fetches an input $e_i$ from the A/D converter 16 (STEP 2), stores the input as a positive peak value $e^+_m$ at a predetermined address of the RAM 18 (STEP 3), and simultaneously applies the ramp signal to the D/A converter 20 (STEP 4). The ramp signal is arranged so that its level is gradually raised at a fixed rate on a clock timing basis. The microprocessor 17 fetches the input $e_i$ again from the A/D converter 16 (STEP 5) and determines whether or not the value $e_i$ is smaller than the peak value $e^+_m$ stored in the RAM 18 (STEP 6). When $e_i \geq e^+_m$, the microprocessor 17 rewrites the positive peak value $e^+_m$ in the RAM 18 (STEP 7) and then causes the operation to move back to STEP 4. The aforesaid operation sequence is repeated until the condition $e_i < e^+_m$ is identified in STEP 6.

At a stage in which $e_i < e^+_m$ is identified in STEP 6, the positive peak value $e^+_m$ is ultimately obtained and the microprocessor 17 fetches in the input $e_i$ from the A/D converter 16 to subsequently hold a negative peak value $e^-_m$ (STEP 8) and causes the negative value $e^-_m$ to be stored at a predetermined address of the RAM 18 (STEP 9). Further, the microprocessor 17 produces the ramp signal to move the objective lens (STEP 10), again fetches in the input $e_i$ form the A/D converter 16 (STEP 11), and checks whether or not the value $e_i$ is greater than the peak value $e^-_m$ stored in the RAM 18 (STEP 12). When $e_i \geq e^-_m$, the microprocessor 17 rewrites the peak value $e^-_m$ in the RAM 18 (STEP 13) and then causes the operation to move again to STEP 10. The aforesaid operation sequence is repeated until $e_i \geq e^-_m$ is identified in STEP 12.

At a stage in which the condition $e_i > e^-_m$ is identified in STEP 12, the negative peak value $e^-_m$ is ultimately obtained. According to the positive and negative values $e^+_m$ and $e^-_m$, the microprocessor 17 computes the peak-to-peak value p-p Of the focus error signal as $(e^+_m - e^-_m)$ (STEP 14) and calculates the difference in level between that detected peak-to-peak value p-p and the reference value p-p (STEP 15). Further, the microprocessor 17 selects a gain constant corresponding to the level difference from the gain constant table prestored in the ROM 19 (STEP 16) and controls the gain of the error amplifier 2 through the gain control circuit 15. As a result, the gain of the error amplifier 2 conforms to the gain constant thus selected (STEP 17). The operation of correcting the gain of the focus servo loop is completed through the series of operations described above.

In each of the aforesaid embodiments, the objective lens is perpendicularly brought close to the disk face one time (objective lens lifting operation) and the loop gain is corrected in accordance with the peak-to-peak value p-p of the focus error signal obtained then. However, the operation of moving up and down the objective lens may be repeated several times to obtain the average of a plurality of the values p-p of the focus error signal and the loop gain may be corrected in accordance with the average value. In this case, more accurate correction becomes possible.

It is also possible to correct the loop gain while a slider for radially moving the pickup and a spindle motor for rotatingly driving the disk are operated.

Figure 5:
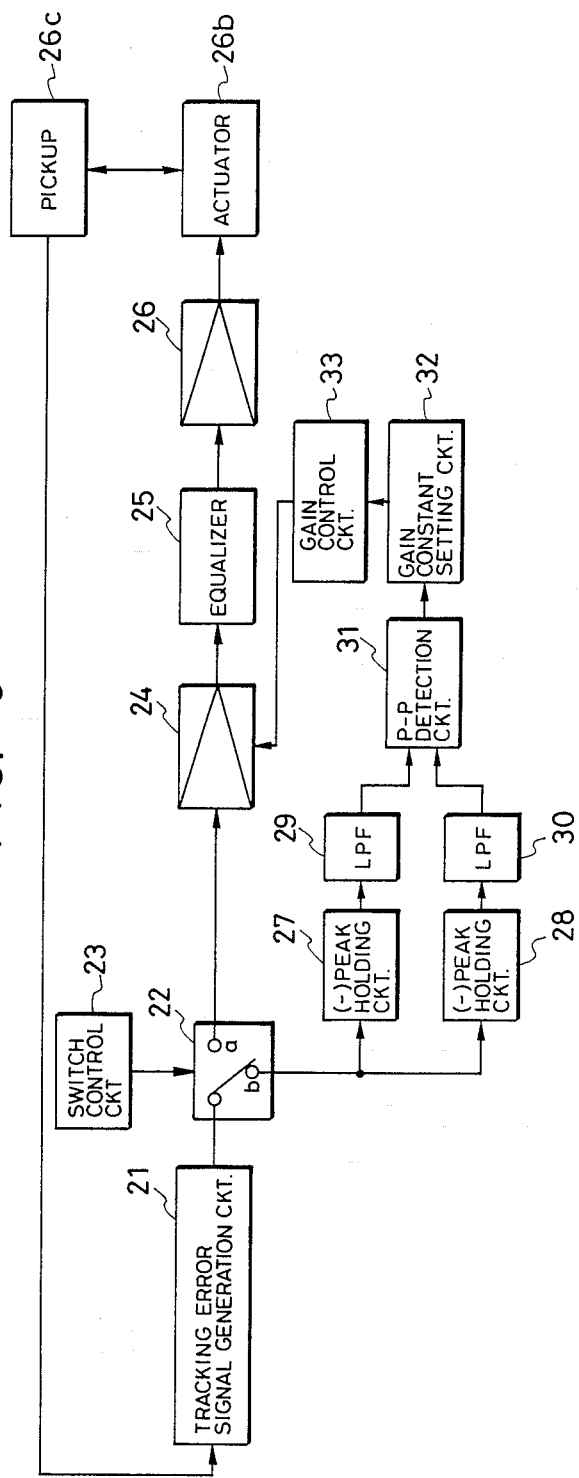
FIG. 5 is a block diagram showing another embodiment of the present invention applied to a tracking servo system.

FIG. 5 is a block diagram showing another embodiment of the present invention applied to the tracking servo system. In FIG. 5, a tracking error signal generation circuit 21 is used to generate a tracking error signal based on a light beam emitted from a pickup 26c and reflected from, e.g., the recording face of a disk. For the generation of the tracking error signal, there are prepared three beams, namely, a main beam for detecting information and two subbeams arranged on both sides of the main beam and used for tracking detection in such a manner that the line connecting the centers of these beams makes an offset angle with the direction of a track. In the so-called 3-beam method above, an error signal is obtained from the difference in the quantity of the two subbeams of light reflected from the recording face of the disk. As the way of obtaining the error signal under the 3-beam method is well known, the description of the specific detailed design and function thereof will be omitted.

The tracking error signal generated by a tracking error signal generating circuit 21 is supplied to a loop switch 22. the switching operation of the loop switch 22 is controlled by a switch control circuit 23. When the loop switch 22 contacts its a and b sides, the servo loop is respectively closed and opened. The tracking error signal is supplied to a tracking actuator 26b radially moving the pickup 26c through an equalizer circuit 25 and a drive amplifier 26 after the gain is amplified by a variable error amplifier 24 while the servo loop is closed. The tracking actuator is designed to deflect a light spot for detecting information (information detecting spot) contained in the pickup in the direction perpendicular to the recording track (radial direction of the disk).

A tracking servo loop is thus formed and, by driving the tracking actuator according to the level of the tracking error signal generated in the tracking error signal generating circuit 21, the light spot for detecting information is caused to follow the recording track of the disk accurately at all times.

Figure 6:
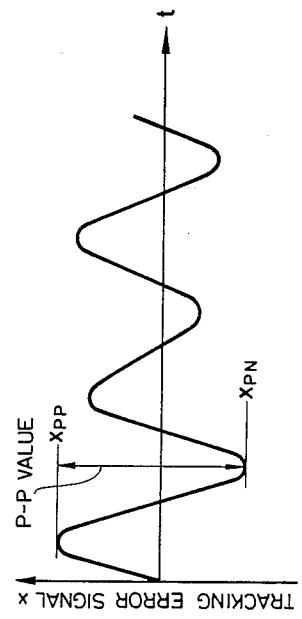
FIG. 6 illustrates a change in the waveform of a tracking error signal while the servo loop is opened.
Figure 7:
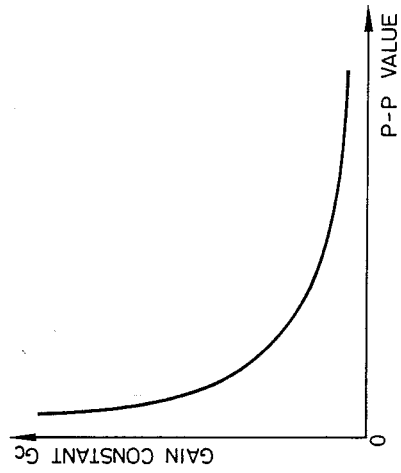
FIG. 7 is a characteristic graph showing the relation between the detected value p-p and a gain constant.

On the other hand, the switch control circuit 23 is operated so that the loop switch 22 contacts the side b to set the servo loop open for a fixed period when the disk rises up and is searched. While the servo loop is a opened, the tracking error signal changes as shown in FIG. 6 and is supplied to a positive peak holding circuit 27 and to a negative peak holding circuit 28. Positive and negative peak values $p_P$ and $p_N$ are held in the circuits 27 and 28, respectively. The peak outputs $p_P$ and $p_N$ thus held in these peak holding circuits 27 and 28 are supplied to a p-p value detecting circuit 31 respectively through LPFs (low pass filters) 29 and 30 and a peak-to-peak value p-p is detected in the p-p detecting circuit 31. The peak-to-peak value p-p thus detected is supplied to a gain setting circuit 32. The gain setting circuit 32 has a gain constant table set to provide the relationship shown in FIG. 7 between gain constants $G_c$ and the detected peak-to-peak values p-p. The gain setting circuit 32 selects a gain constant $G_c$ corresponding to the output of the p-p detecting circuit 2 and supplies the corresponding output to a gain control circuit 33. The gain control circuit 33 controls the gain of the error amplifier 24 in accordance with the output of the gain setting circuit 32.

The loop gain can thus be set and maintained at the optimum value by detecting the peak-to-peak value p-p of the tracking error signal obtained while the servo loop is opened. A gain constant is set according to the detected peak-to-peak value p-p and the gain of the error amplifier 24 is controlled in conformity with the gain constant despite variations in the power of a light source such as a laser diode, disk reflectance and of error signal detecting and amplifying systems. Thereby stable tracking operation is obtainable at all times.

The waveform of the tracking error signal with the servo loop being open is subjected to frequency modulation because of the eccentricity of the disk and, because the modulated frequency is low, it requires a lengthy time to hold the peak value of the error signal accurately unless the number of revolutions of a spindle motor for driving and rotating the disk reaches a fixed value. When an LPF for noise elimination is provided on the input side of the tracking error signal, moreover, the frequency of the signal is modulated by the eccentricity of the disk and the amplitude thereof is caused to fluctuate by the LPF. Therefore, peaks are held over the periods of the eccentricity of the disk to obtain the mean of the values in the positive and negative peak holding circuits 27 and 28 so that the peaks can be held accurately. That is, provided the number of revolutions of the spindle motor is at a given rate or higher with the peak holding time being assumed constant, the number of eccentric peaks contained therein becomes constant or greater. In consequence, the peaks can be held accurately.

Although it has been arranged in the aforesaid embodiment that the peak-to-peak value p-p of the focus error signal prior to being amplified is detected in the error amplifier 24, the peak-to-peak value thereof after being amplified may be detected.

Figure 8:
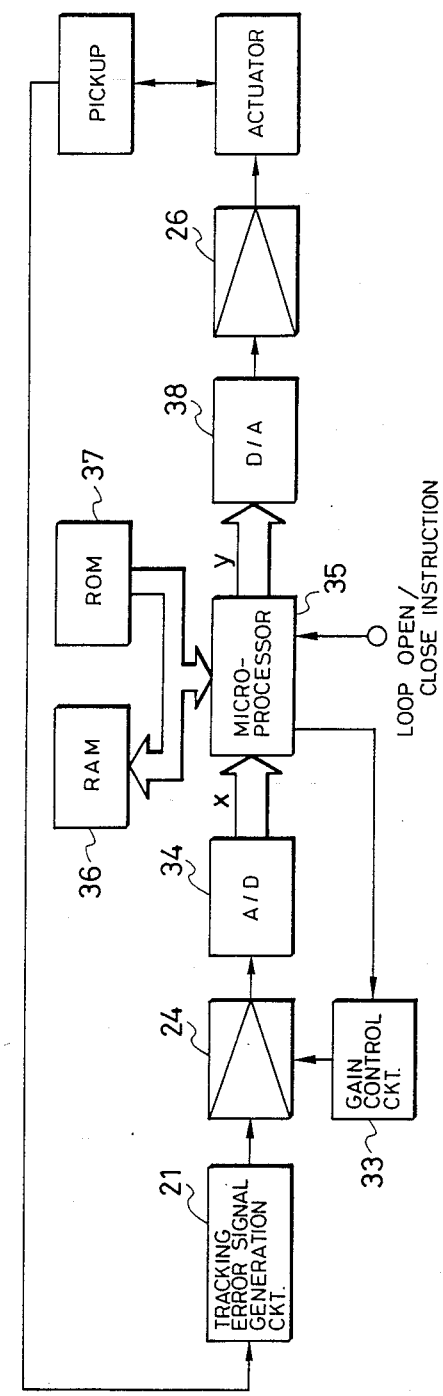
FIG. 8 is a block diagram when the system of FIG. 5 is formed with a microprocessor.

Although a description has been given of a case where the loop gain is corrected by the hardware in the aforesaid embodiment, it is also possible as shown in FIG. 8 to do so by means of software and a microprocessor with effect equivalent to what is achievable as aforementioned.

In FIG. 8, like reference characters given to like or corresponding parts of FIG. 5. In this embodiment, a description will be given of a case where the peak-to-peak value p-p of the focus error signal is detected after being amplified by the error amplifier 24. In FIG. 8, the focus error signal amplified by the error amplifier 24 is converted by an A/D converter 34 into a digital signal before being supplied to a microprocessor 35. The microprocessor 35 subjects the focus error signal to undergo given equalization while the loop is closed. While the loop is opened, the microprocessor 35 fetches in the output level of the A/D converter 34 and holds the positive and negative peak levels in a RAM 36 while it detects the peak-to-peak value p-p according to these peak levels. It reads out a gain constant $G_c$ corresponding to the peak-to-peak value p-p from a ROM 37, and sends a corresponding output to the gain control circuit 33. The gain control circuit 33 controls the gain of the error amplifier 24 in accordance with the output of the microprocessor 35. The tracking error signal produces by the microprocessor 35 is converted by a D/A converter 38 into an analog signal, which is then supplied to the tracking actuator through the drive amplifier 26.

Figure 9:
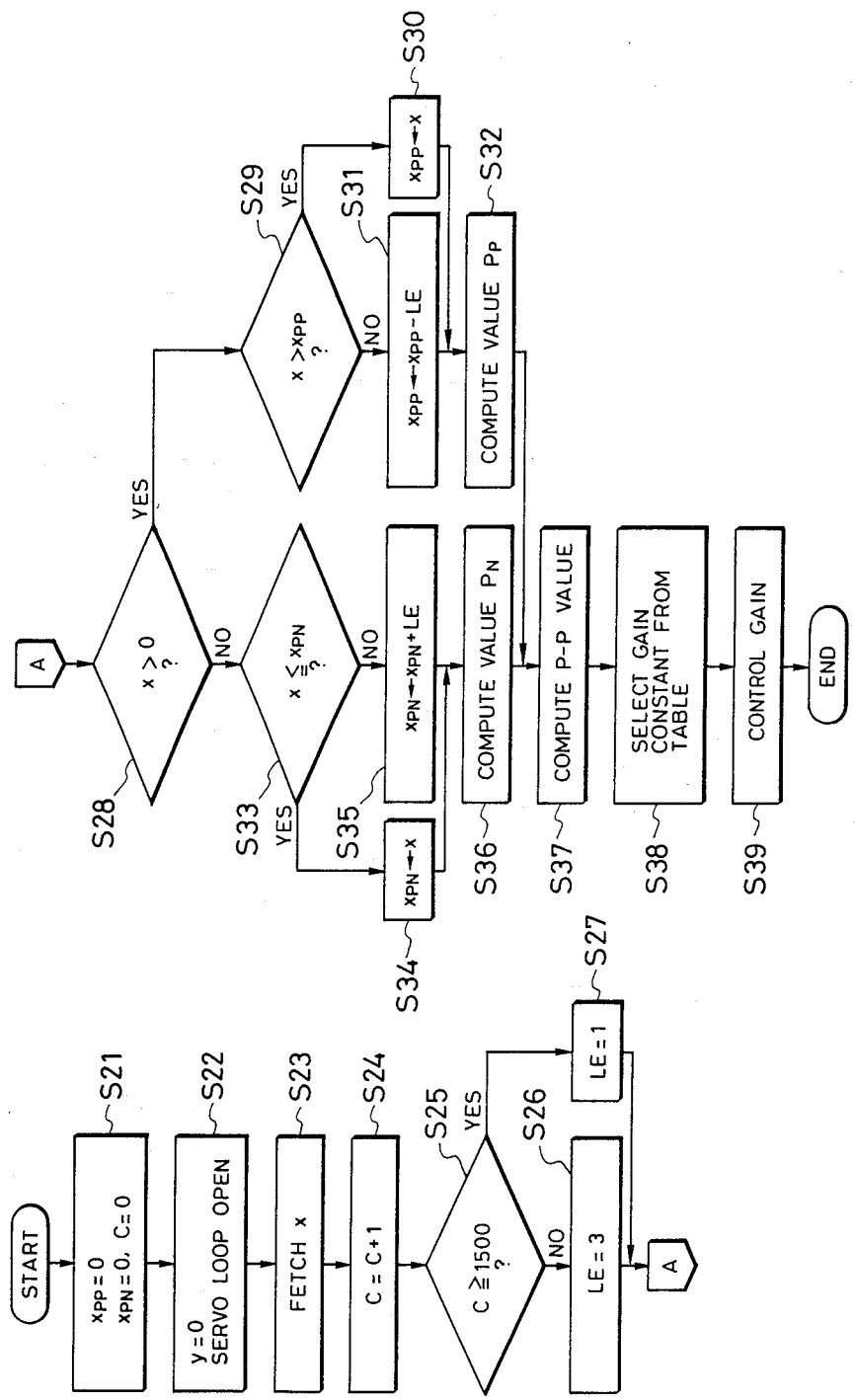
FIG. 9 is a flowchart showing an operating procedure executed by the microprocessor of FIG. 8.

Referring to a flowchart of FIG. 9, a description will further be given of a procedure for setting the gain constant $G_c$ executed by the microprocessor 35. The operation is conducted while the focus servo is in the locked state and during a fixed period of time, e.g., 150 millisec after the number of revolutions of the spindle motor has reached a predetermined value, with a sampling frequency of 30 kHz set for the purpose.

A value C counted by a counter for counting up values synchronously with the sampling period and the detected peak values $X_{PP}$ and $X_{PN}$ are initially reset (STEP S21). Subsequently, the value y of the tracking error signal produced by the microprocessor 35 is set to zero with the servo loop being kept open (STEP S22) and then the microprocessor 35 fetches in the tracking error signal X (STEP S23). The counted value C is then incremented (STEP S24) and it is checked whether or not the counted value C counted is equal to or greater than a predetermined reference value, e.g., 1,500 (STEP S25). When C<1,500, a filter constant LE is set at a first larger value, e.g. 3, and, when C≧1,500, the filter constant LE is set as a second smaller value, e.g. 1 (STEPs S26, S27).

The filter constant LE is the value set to counter noise at the time of holding the peak. For an initial time period, e.g., 50 millisec (the reference counting value of 1,500 is set by the 50 millisec initial period and the sampling frequency of 30 kHz) at the beginning of a sample holding period (150 millisec), the detection of the peak values $X_{PP}$ and $X_{PN}$ is improved against the changes of the peaks of the error signal by setting a larger filter constant LE=3 and thereafter the filter constant (equivalent to the leakage is an RC filter) is reduced by setting LE=1 so as to improve the holding characteristics. In STEP S28, it is determined whether the tracking error signal X is positive or negative. When X>0, it is judged whether or not the error signal X is greater than the peak value $X_{PP}$ determined up to this time (STEP S29). When X>$X_{PP}$, the current error signal (fetched this time) is set as the detected peak value $X_{PP}$ (STEP S30). When X≦$X_{PP}$, the value obtained by subtracting the filter constant LE from the current $X_{PP}$ is set as a new current peak value $X_{PP}$ (STEP S31). Then a positive peak value $P_p$ is computed from the detected peak value $X_{PP}$ after filtering (equivalent to the fact that the signal has been filtered through the LPF 29 in FIG. 5) (STEP S32).

When it was judged that X≦0 in STEP S28, on the other hand, it is determined whether or not the error signal X is less than the peak value $X_{PN}$ detected up to the last time (STEP S33). When X≦$X_{PP}$, the error signal fetched this time is set as the current detected peak value $X_{PN}$ (STEP S34). When X>$X_{PP}$, the sum of the peak value $X_{PN}$ detected and the constant LE is set as the detected peak value $X_{PN}$ (STEP S35). Subsequently, a negative peak value $P_N$ is computed from the detected peak value $X_{PN}$ after filtering (equivalent to the fact that the signal has been filtered through the LPF 30 in FIG. 5 (STEP S36). The peak-to-peak value p-p is computed from an equation ($P_P - P_N$) involving the positive and negative peak values $P_P$ and $P_N$ thus obtained (STEP S37). A gain constant $G_c$ corresponding to the peak-to-peak value p-p is subsequently selected from the gain constant table set according to the characteristics shown in FIG. 7 and prestored in the ROM 37 (STEP S38). The gain of the error amplifier 34 is so controlled through the gain control circuit 33 that it corresponds to the gain constant $G_c$ (STEP S39). The operation of correcting the gain of the tracking servo loop is completed through a series of the aforesaid operations.

Although in the embodiments of FIGS. 3 and 8 the error amplifiers 2 and 24 are arranged before the A/D converters 16 and 34 so as to correct the loop gain at the analog stage by controlling the gain of the error amplifiers 2 and 24 through the gain control circuits 15 and 33 in accordance with the gain constant obtained from the microprocessors 27 and 35, it is also possible to correct the loop gain at the digital stage by multiplying the gain constant thus obtained by the signal level of the error signal in each of the microprocessors 17 and 35.

As set forth above, the peak-to-peak value p-p obtainable with the servo loop opened is detected and the gain constant is set based on the detected peak-to-peak value p-p and further the gain of the variable gain amplifier is controlled in proportion to the g in constant according to the present invention. Thereby stable servo operation is realized at all times as the gain of the servo loop can always be maintained at the optimum value.

What is claimed is:

1. A method of correcting a loop gain of a servo loop, said servo loop being of the type wherein an error signal is derived from signal representing the condition of an object and wherein said object is driven toward a desired condition in accordance with said error signal, said method comprising the steps of:

opening a servo loop;

changing the condition of said object to cause said error signal to pass through an upper peak representing a maximum error in a first direction and a lower peak of said error signal representing a maximum error in a second direction;

detecting a peak-to-peak value of an error signal of said servo loop while said servo loop is open, wherein said peak-to-peak value represents the difference between said upper and lower peaks of said error signal;

adjusting an amplification gain in accordance with said detected peak-to-peak value;

closing said servo loop; and operating said closed servo loop including amplifying said error signal by said adjusted amplification gain.

2. A method of correcting a loop gain as recited in claim 1, further comprising the step of moving a mechanical component included in said servo loop in predetermined motion while said servo loop is opened.

3. A method of correcting a loop gain as recited in claim 2, wherein said mechanical component is an optical pickup operatively connected with a rotating disk and wherein said predetermined motion is an approach of said pickup substantially perpendicularly to a surface of said disk.

4. A method of correcting a loop gain as recited in claim 2, wherein said mechanical component is a pickup operatively connected with a rotating disk and wherein said predetermined motion is a motion of said pickup parallel to a surface of said disk.

5. A method of correcting a loop gain as recited in claim 1, wherein said detecting step includes a step of determining a positive peak of said error signal and a step of determining a negative peak of said error signal, and wherein said peak-to-peak value is a difference of said positive and negative peaks.

6. A method of correcting a loop gain as recited in claim 5, wherein said two determining steps each include a low-pass filtering step for filtering time variations of said positive and negative peak, respectively.

7. A method of correcting a loop gain as recited in claim 1, wherein said servo loop controls an actuator and wherein said error signal represents an error between desired and actual actuator states.

8. An apparatus for correcting a loop gain of a servo loop, said servo loop being of the type wherein an error signal is derived from a signal representing the condition of an object and wherein said object is driven toward a desired condition in accordance with said error signal, said apparatus comprising:

a servo loop including an error detection signal source, a variable gain amplifier receiving an output of said error detection signal source and switching means for opening and closing said servo loop;

means for changing the condition of said object while said switching means has opened said servo loop to cause said error signal to pass through an upper peak representing a maximum error in a first direction and a lower peak of said error signal representing a maximum error in a second direction;

means for detecting a peak-to-peak value of said error detection signal while said switching means has opened said servo loop, wherein said peak-to-peak value represents the difference between said upper and lower peaks of said error signal;

means for setting a gain constant according to said detected peak-to-peak value; and means for controlling a gain of said variable gain amplifier according to said set gain constant.

9. An apparatus for correcting a loop gain as recited in claim 8, wherein said detecting means includes:

positive determining means for determining a positive peak value of said error detection signal;

negative determining means for determining a negative peak value of said error detection signal; and differencing means for producing said peak-to-peak value according to said determined positive and negative peak values.

10. An apparatus for correcting a loop gain as recited in claim 9, further comprising two filtering means receiving respective outputs of said positive and negative determining means and providing inputs to said differencing means.

11. An apparatus as recited in claim 8, further comprising a pickup operating upon a rotating disk and included in said servo loop.

12. An apparatus as recited in claim 11, further comprising means for moving said pickup in a predetermined motion while said switching means have opened said servo loop.

13. An apparatus as recited in claim 12, wherein said pickup is an optical pickup and said moving means moves said pickup substantially perpendicularly to a surface of said disk.

14. An apparatus as recited in claim 13, wherein said moving means moves said pickup parallel to a surface of said disk.

15. An apparatus as recited in claim 8, wherein said servo loop controls an actuator and wherein said error signal represents an error between desired and actual actuator states.

* * * * *